United States Patent
Katou et al.

(10) Patent No.: US 8,102,686 B2
(45) Date of Patent: Jan. 24, 2012

(54) RECTIFIER WITH PAM CONTROLLER TO FORCE AN INPUT CURRENT TO APPROXIMATE A SINE WAVE

(75) Inventors: Masakazu Katou, Osaka (JP); Ryou Nakamoto, Osaka (JP); Keisuke Shimatani, Osaka (JP); Keiichi Yoshisaka, Osaka (JP); Masafumi Hashimoto, Osaka (JP)

(73) Assignee: Daikin Industries, Ltd., Osaka (JP)

(*) Notice: Subject to any disclaimer, the term of this patent is extended or adjusted under 35 U.S.C. 154(b) by 0 days.

(21) Appl. No.: 12/593,766

(22) PCT Filed: Mar. 18, 2008

(86) PCT No.: PCT/JP2008/000631
§ 371 (c)(1),
(2), (4) Date: Sep. 29, 2009

(87) PCT Pub. No.: WO2008/129796
PCT Pub. Date: Oct. 30, 2008

(65) Prior Publication Data
US 2010/0014334 A1    Jan. 21, 2010

(30) Foreign Application Priority Data
Mar. 30, 2007   (JP) .................................. 2007-094117

(51) Int. Cl.
*H02M 7/02*    (2006.01)

(52) U.S. Cl. ............................. 363/61; 323/300; 307/110
(58) Field of Classification Search .................... 363/61, 363/44–48, 84, 89–90, 125–127, 142–143; 307/110; 323/300
See application file for complete search history.

(56) References Cited

U.S. PATENT DOCUMENTS

| | | | | |
|---|---|---|---|---|
| 5,287,263 A | * | 2/1994 | Shilo | 363/143 |
| 5,654,884 A | * | 8/1997 | Mohan | 363/126 |
| 6,137,700 A | * | 10/2000 | Iida et al. | 363/89 |
| 6,212,083 B1 | * | 4/2001 | Sakakibara | 363/126 |

FOREIGN PATENT DOCUMENTS

| | | |
|---|---|---|
| JP | 10-178780 A | 6/1998 |
| JP | 2000-166241 A | 6/2000 |
| JP | 2001-145358 A | 5/2001 |
| JP | 2003-174779 A | 6/2003 |

* cited by examiner

*Primary Examiner* — Harry Behm
(74) *Attorney, Agent, or Firm* — Birch, Stewart, Kolasch & Birch, LLP (57) ABSTRACT

An electric power supply circuit includes a diode bridge circuit (12) for rectifying an alternating current, a switching element (S) for causing a short-circuit for output power of the diode bridge circuit (12), and a PAM control section (15) for causing the switching element (S) to perform switching with a predetermined timing so that a waveform of an input current approximates to a sine wave. The PAM control section (15) outputs ON/OFF pulses so that five pulses are output for each zero-cross point and one of the five pulses located in center extends over the zero-cross point at any time.

6 Claims, 6 Drawing Sheets

RECTIFIER WITH PAM CONTROLLER TO FORCE AN INPUT CURRENT TO APPROXIMATE A SINE WAVE

TECHNICAL FIELD

The present invention relates to an electric power supply circuit, and more particularly, relates to a technique to improve controllability of PAM control.

BACKGROUND ART

Conventionally, power supply apparatuses (power supply circuits) for converting alternating current power to direct current power using a rectifier circuit have been known. In a power supply apparatus of this type, a high frequency current tends to be generated, resulting in reduction in power supply efficiency. To prevent such reduction in power supply efficiency, for example, Patent Document 1 discloses a power supply apparatus configured to reduce the high frequency current using a so-called PAM (pulse amplitude modulation) control.

Specifically, the power supply apparatus of Patent Document 1 includes a rectifier circuit, which is a diode bridge circuit, and a smoothing circuit. The smoothing circuit includes two capacitors coupled in series with each other, and a single capacitor coupled in parallel with the two capacitors and is configured to perform double voltage rectification between the smoothing circuit and the rectifier circuit. The power supply apparatus further includes a switching element, provided at an output terminal of the rectifier circuit, for causing, when being turned ON, a short-circuit for output power of the rectifier circuit.

In the power supply apparatus, PAM control is performed. Specifically, in the rectifier circuit, the switching element is switched according to zero-cross points of an input voltage so that a waveform of an input current approximates to a waveform (a sine wave) of an input voltage. That is, an ON duty of a PAM waveform is controlled by this switching operation, so that the waveform of an input current approximates to a sine wave. Accordingly, the high frequency current is reduced.
Patent Reference 1: Japanese Published Application No. 2001-145358

DISCLOSURE OF THE INVENTION

Problems which the Invention is to Solve

According to Patent Document 1, the ON duty of a PAM waveform is controlled. Presumably, it is also possible to cause the waveform of the input current to approximate to a sine wave by maintaining constant widths of ON/OFF pulses of a PAM waveform and then controlling a phase of the PAM waveform.

However, in such a case, as in Patent Document 1, when the power supply apparatus is configured so that an ON pulse is output first at a zero-cross point of an input voltage, the constant widths of ON/OFF pulses of the PAM waveform cannot be maintained. That is, when the phase of the PAM waveform is shifted, and thus, for example, the ON pulse of the PAM waveform extends over the zero-cross point of the input voltage, an OFF pulse normally has to be output at the zero-cross point with an advanced timing, compared to an output timing before the shift, to ensure the constant width of ON pulses. However, in such a case, since a power supply apparatus is configured so that an ON pulse is output first, an OFF pulse cannot be output with an adequate timing, and thus, the width of the ON pulse is increased.

As a possible solution to this problem, when the phase of the PAM waveform is shifted, and thus, an ON pulse extends over the zero-cross point, an output order of ON and OFF pulses is changed so that an OFF pulse, instead of an ON pulse, is output first. Accordingly, however, two different output orders (output timings) of ON/OFF pulses have to be provided, thus resulting in increase in complexity of control.

In view of the above-described points, the present invention has been devised, and it is therefore an object of the present invention to provide an electric power supply circuit, including a switching element for causing a short-circuit for output power of a rectifier circuit, for performing PAM control, in which only one output timing of a PAM waveform for ON/OFF pulses is provided and phase control of the PAM waveform is performed.

Solution to the Problems

According to a first aspect of the present invention, an example electric power supply circuit includes: a rectifier circuit (12), coupled to an alternating current power supply, for rectifying an alternating current; a switching element (S) for causing, when being turned ON, a short-circuit for output power of the rectifier circuit (12); and a PAM control section (15) for outputting, with a predetermined timing based on a zero-cross point of an input voltage of the rectifier circuit (12), a plurality of ON/OFF pulses to cause the switching element (S) to perform switching so that a waveform of the input current approximates to a sine wave. In this example power supply circuit, the PAM control section (15) outputs the ON/OFF pulses so that an ON pulse is generated to extend over the zero-cross point of the input voltage of the rectifier circuit (12).

In the example electric power supply circuit, the PAM control section (15) outputs a PAM waveform including ON/OFF pulses with a predetermined timing based on a zero-cross point of an input voltage. Thus, the switching element (S) performs switching with a predetermined timing, so that the waveform of the input current is caused to be (to approximate to) a sine wave of the input voltage.

In the above-described PAM control, an ON pulse of the PAM waveform is output so as to extend over the zero-cross point of the input voltage at any time. Accordingly, in the PAM control, an output timing is set so that an OFF pulse is output first at a predetermined time point after a lapse of a certain time from the zero-cross point, and subsequently, an ON pulse is output. In this case, even when the phase of the PAM waveform is shifted due to some disturbance or the like, the ON pulse extending over the zero-cross point before the shift still stays extending over the zero-cross point. Thus, an OFF pulse is output first with a predetermined timing based on the zero-cross point.

According to a second aspect of the present invention, in the example electric power supply circuit of the first aspect, the PAM control section (15) is configured so that an ON/OFF pulse group formed of the ON pulse extending over the zero-cross point, and one or more ON pulses generated both before and after the ON pulse and having a smaller width than that of the ON pulse is generated for each zero-cross point.

In this example electric power supply circuit, the ON/OFF pulse group is generated for each zero-cross point. Thus, the waveform of the input current is caused to be a smoother sine wave. Moreover, the ON pulse extending over the zero-cross point has a larger width than the width(s) of the one or more ON pulses generated both before and after the ON pulse, so that, even though the phase of the PAM waveform is shifted, it is possible to reliably maintain a state where the ON pulse extends over the zero-cross point P.

According to a third aspect of the present invention, in the example electric power supply circuit of the first or second aspect, the PAM control section (15) includes a zero-cross detector section (5a) for detecting an increase in the input voltage of the rectifier circuit (12) toward the zero-cross point to a level equal to or higher than a predetermined level, a timer section (5c) for resetting and starting a count each time the zero-cross detector section (5a) detects the increase in the input voltage; and a PAM waveform output section (5b) configured to output with a predetermined timing, using a count of the timer section (5c), an OFF pulse first after a lapse of a certain time from a first zero-cross point since the detection by the zero-cross detector section (5a), and thereafter, alternately output ON and OFF pulses with a predetermined timing.

In this example electric power supply circuit, the zero-cross detector section (5a) detects a certain point at which the input voltage rises toward the zero-cross point. That is, a point prior to the zero-cross point is detected only once in one cycle of the input voltage. When the prior point to the zero-cross point is detected, the timer section (5c) starts a count. Also, when the zero-cross detector section (5a) detects the prior point, an OFF pulse is output first from the PAM waveform output section (5b) at a predetermined count of the timer section (5c). Thereafter, ON and OFF pulses are alternately output with a predetermined timing. Thus, a desired PAM waveform is generated. That is, in consideration of an amount of time between detection by the zero-cross detector section (5a) and a first zero-cross point, the predetermined timing with which OFF/ON pulses are output so that an OFF pulse is output first and an ON pulse is subsequently output is set in the PAM waveform output section (5b).

According to a fourth aspect of the present invention, in the example electric power supply circuit of the third aspect, when an output phase of ON/OFF pulses is shifted, the PAM waveform output section (5b) is configured to correct an output timing of each of the ON/OFF pulses by an amount corresponding to a shift each time the zero-cross detector section (5a) detects the increase in the input voltage.

In this example electric power supply circuit, when the phase of ON/OFF pulses is shifted, the output timing in the PAM waveform output section (5b) is corrected accordingly. For example, in FIG. 2, when the phase of the waveform is shifted to the left, the output timing is corrected to be advanced and, in contrast, when the phase of ON/OFF pulses is shifted to the right, the output timing is corrected to be delayed. At the time of the correction, an ON pulse extending over the zero-cross point before the phase is shifted still stays extending over the zero-cross point.

According to a fifth aspect of the present invention, in the example electric power supply circuit of the second aspect, the ON/OFF pulse group is formed of ON/OFF pulses arranged in a symmetrical pattern with respect to the ON pulse extending over the zero-cross point.

In this example electric power supply circuit, the number of ON/OFF pulses included in the ON/OFF pulse group is an odd number. That is, the same number of pulses are generated before and after the ON pulse extending over the zero-cross point so that each pulse located before the zero-cross point has the same width as an associated one of pulses located after the zero-cross point.

According to a sixth aspect of the present invention, in the example electric power supply circuit of any one of the first through third aspects, the rectifier circuit is a diode bridge circuit (12), and the electric power supply circuit is configured so that two capacitors (C1 and C2) coupled in series with each other are provided at an output side of the diode bridge circuit (12), an input side of the diode bridge circuit (12) and a point between the two capacitors (C1 and C2) are coupled via the switching element (S), and thereby, double voltage rectification is performed.

Figure 1:
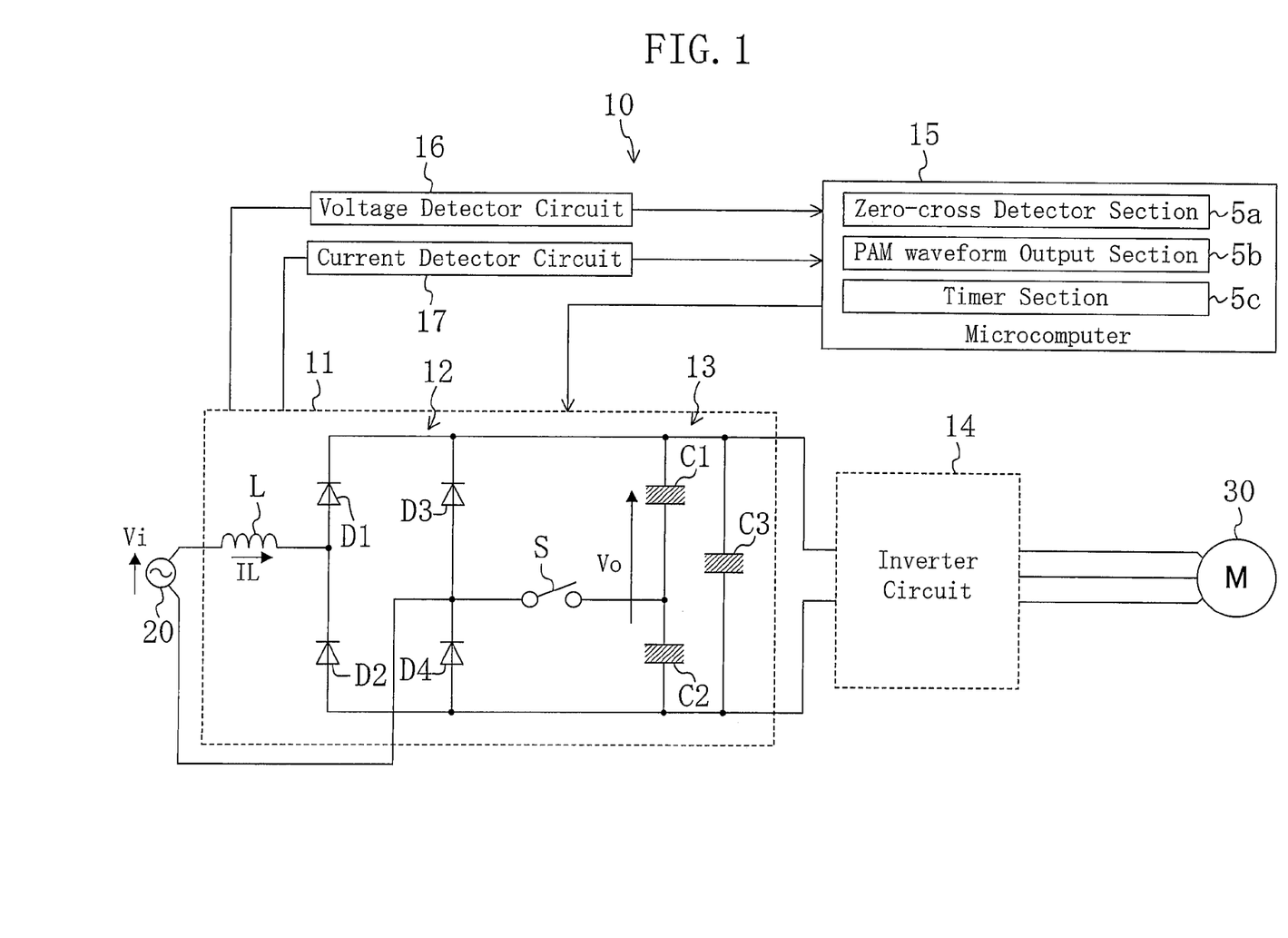
FIG. 1 is a schematic wiring diagram illustrating a configuration of an entire electric power supply circuit according to an embodiment of the present invention.

In this example electric power supply circuit, for example, as shown in FIG. 1, a circuit for performing double voltage rectification is achieved. That is, the example electric power supply circuit of the present invention is configured so as to be switched to serve as a double voltage rectifier circuit when the switching element (S) is turned ON, and to be switched to serve as a full-wave rectifier circuit when the switching element (S) is turned OFF.

Effects of the Invention

According to the present invention, ON/OFF pulses are output so that an ON pulse is generated to extend over a zero-cross point of an input voltage of the rectifier circuit (12). Thus, even when a phase of a waveform (PAM waveform) including the ON/OFF pulses is shifted, an OFF pulse is output first at any time. That is, it is sufficient to set only one output timing with which an OFF pulse is output first. Accordingly, a plurality of output timings do not have to be prepared, so that PAM control can be simplified.

Furthermore, ON/OFF pulses can be reliably output with a predetermined timing. Thus, a desired PAM waveform can be reliably generated. As a result, the waveform of an input current can be reliably caused to be a sine wave, so that the high frequency current can be further reduced.

According to the third aspect of the present invention, ON/OFF pulses are output with a predetermined timing using a count of the timer section (5c). Thus, as described above, only one output timing has to be provided, so that it is not necessary to prepare multiple timings for the timer section (5c). Thus, in contrast to the known technique in which, when the ON pulse no longer extends over the zero-cross point P, another timer section for starting a count with another timing is additionally needed, there is no need to provide an additional timer section. Therefore, the configuration of the microcomputer (15) can be simplified.

EXPLANATION OF REFERENCE NUMERALS

10 Electric power supply circuit
12 Diode bridge circuit (rectifier circuit)
15 Microcomputer (PAM controller section)

5a Zero-cross detector section
5b PAM waveform output section
5c Timer section
S Switching element
D1 through D4 Diode
C1, C2 Capacitor

BEST MODE FOR CARRYING OUT THE INVENTION

Hereinafter, embodiments of the present invention will be described in detail with reference to the accompanying drawings.

As shown in FIG. 1, an electric power supply circuit (10) according to this embodiment includes a converter circuit (11), an inverter circuit (14) and a microcomputer (15).

The electric power supply circuit (10) is configured to rectify alternating current power in the converter circuit (11), convert the rectified direct current to a three-phase alternating current in the inverter circuit (14), and supply the three-phase alternating current to an electric motor drive (30). The electric motor drive (30) drives a compressor provided in a refrigerant circuit in an air conditioning system. Although not shown in FIG. 1, the refrigerant circuit of the air conditioning system is configured so that the compressor, a condenser, an expansion mechanism and an evaporator are coupled to form a closed circuit. Thus, a refrigerant circulates in the closed circuit, thereby performing vapor compression refrigeration cycle. In a cooling operation, air cooled by the evaporator is supplied into a room. In a heating operation, air heated by the condenser is supplied into a room.

The converter circuit (11) is coupled to an alternating current power supply (20) to rectify alternating current power. The converter circuit (11) includes a reactor (L) as well as a diode bridge circuit (12) and a smoothing circuit (13).

The diode bridge circuit (12) is coupled to the alternating current power supply (20) and including bridge-connected four diodes (D1 through D4). That is, the diode bridge circuit (12) rectifies alternating current power and serves as a rectifier circuit according to the present invention.

The smoothing circuit (13) is provided at an output side of the diode bridge circuit (12). The smoothing circuit (13) includes two capacitors (C1 and C2) coupled in series with each other, and a capacitor (C3) coupled in parallel to the two capacitors (C1 and C2). The two capacitors (C1 and C2) coupled in series with each other charge/discharge an output voltage of the diode bridge circuit (12). The capacitor (C3) coupled in parallel to the capacitors C1 and C2 smoothes an output voltage ($V_0$) of the two capacitors (C1 and C2). That is, the smoothing circuit (13) double-voltage rectifies a voltage between the smoothing circuit (13) and the diode bridge circuit (12).

The reactor (L) is coupled between one of electrodes of the alternating current power supply (20) and the diode bridge circuit (12).

The converter circuit (11) includes a switching element (S) capable of switching bidirectionally between ON and OFF. The switching element (S) is coupled between an input side of the diode bridge circuit (12) and a point between the two capacitors coupled in series with each other. That is, the converter circuit (11) of this embodiment is turned to serve as a double voltage rectifier circuit when the switching element (S) is switched ON, and is turned to serve as a full-wave rectifier circuit when the switching element (S) is turned OFF.

The inverter circuit (14) converts a direct current voltage of the capacitor (C3) to a three-phase alternating current voltage, and supplies the three-phase alternating current voltage to the electric motor drive (30). Note that, although not shown, the inverter circuit (14) has a general configuration in which, for example, six switching elements are coupled with one another in the form of a three-phase bridge.

The microcomputer (15) performs, in addition to switching control of the inverter circuit (14), PAM (pulse amplitude modulation) control of the converter circuit (11), and serves as a PAM control section according to the present invention. The microcomputer (15) includes a zero-cross detector section (5a), a PAM waveform output section (5b) and a timer section (5c).

The electric power supply circuit (10) of this embodiment further includes a voltage detector circuit (16) for detecting an input voltage (Vi) of the diode bridge circuit (12), and a current detector circuit (17) for detecting an input current (IL).

Figure 2:
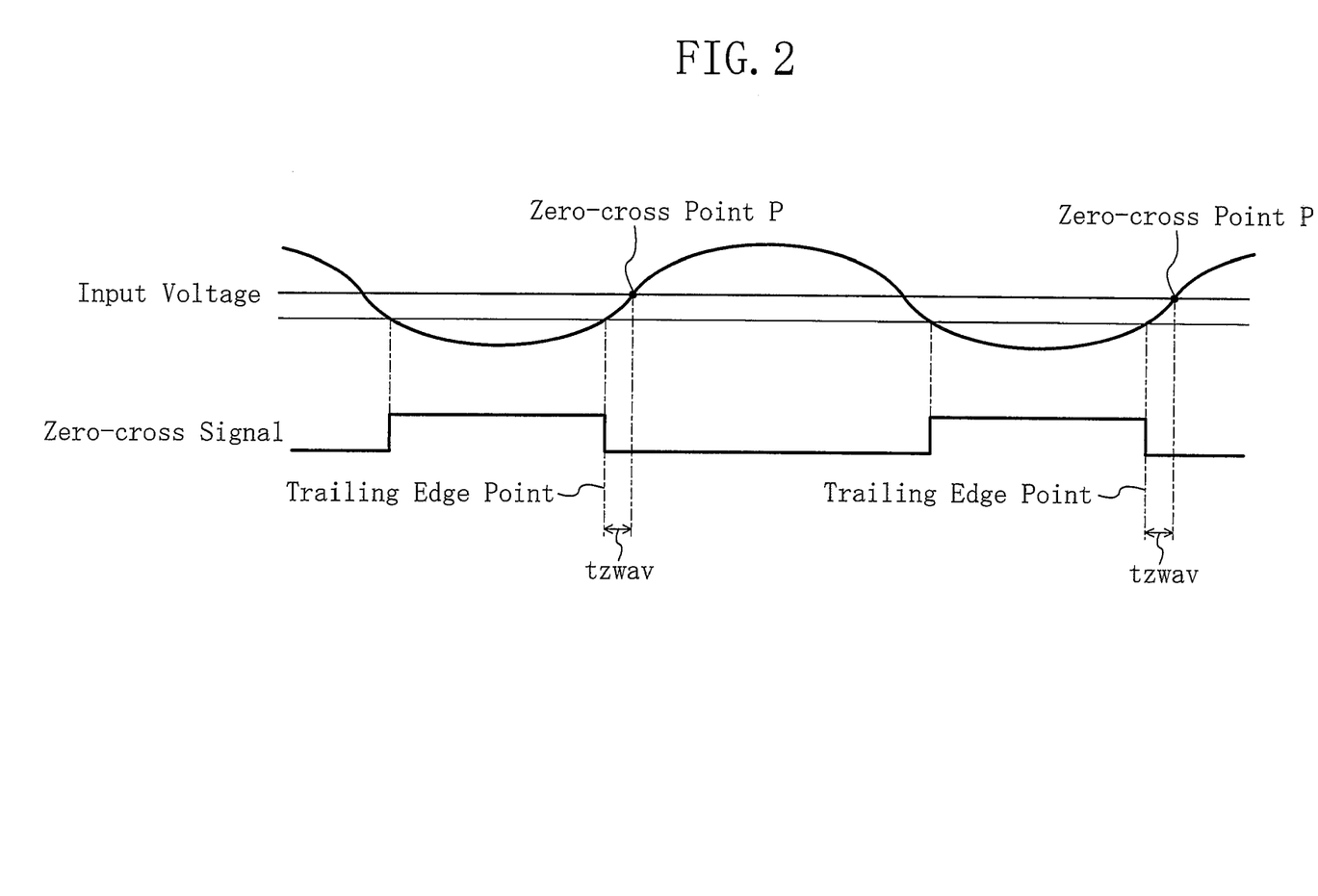
FIG. 2 is a waveform diagram showing the relationship between an input voltage and a zero-cross signal.

As shown in FIG. 2, the zero-cross detector section (5a) outputs a zero-cross signal (ON/OFF signal) according to the input voltage (Vi) detected by the voltage detector circuit (16). Specifically, the zero-cross detector section (5a) outputs an ON signal if the input voltage (Vi) is lower than a predetermined level, and is turned OFF if the input voltage (Vi) is equal to or higher than the predetermined level. That is, by detecting a trailing edge point of the ON signal (hereinafter merely referred to as a "trailing edge point"), it is detected that the input voltage (Vi) has been increased toward a zero-cross point P to be equal to or higher than the predetermined level (see FIG. 3). Accordingly, there is a certain time lag (tzwav) between the trailing edge point and the zero-cross point P.

Figure 3:
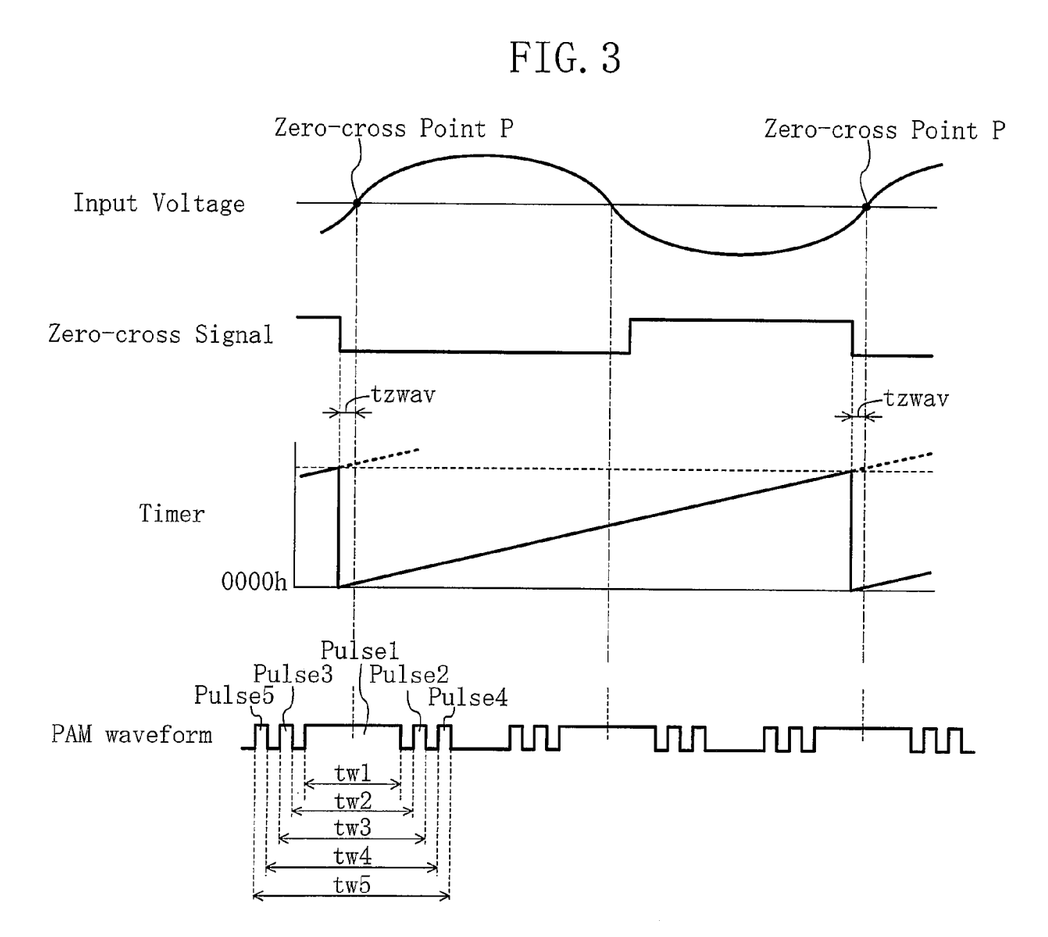
FIG. 3 is a waveform diagram showing an output state of a PAM waveform.

As shown in FIG. 3, when a trailing edge point is detected by the zero-cross detector section (5a), the timer section (5c) starts a count. When a subsequent trailing edge point is detected by the zero-cross detector section (5a), the timer section (5c) is reset and starts a new count. In this manner, the timer section (5c) is reset and starts a new count each time the zero-cross detector section (5a) detects a trailing edge point.

As shown in FIG. 3, the PAM waveform output section (5b) outputs ON/OFF pulses (PAM waveform) which are pulse signals for causing the switching element (S) to perform switching. The PAM waveform output section (5b) outputs ON/OFF pulses so that the waveform of the input current (IL) is caused to be similar (to approximate) to a sine waveform of the input voltage (Vi). Specifically, the PAM waveform output section (5b) outputs, using a count by the timer section (5c), ON/OFF pulses with a predetermined timing (output timing) each time a trailing edge point is detected by the zero-cross detector section (5a). That is, ON/OFF pulses are output with a predetermined timing based on the zero-cross point P of an input voltage (i.e., a first zero-cross point after a trailing edge point detected by the zero-cross detector section (5a)).

As shown in FIG. 3, the PAM waveform output section (5b) outputs ON/OFF pulses so that a pulse group consisting of five pulses is generated for each zero-cross point. The pulse group is generated so that a center pulse 1 (ON pulse) has a larger width than widths of the other four pulses 2 through 5, and has a symmetrical pattern with respect to the center pulse 1. In the pulse group, as shown in FIG. 3, dimensions tw1 through tw5 are fixed. That is, according to this embodiment, a pulse width of the pulse group is fixed.

The PAM waveform output section (5b) outputs ON/OFF pulses so that the center pulse 1 is generated to extend over the zero-cross point P at any time. An output timing for ON/OFF pulses is set so that, when a trailing edge point is detected, the PAM waveform output section (5b) outputs an OFF pulse first, and thereafter, alternately outputs ON and OFF pulses. Thus, according to this embodiment, so-called multi-pulse control in which a plurality of pulses (ON pulses) are generated in half cycle of the input voltage (Vi) is performed.

The PAM waveform output section (5b) is configured to correct, when a phase of the PAM waveform is shifted, the output timing so that the output timing is shifted by an amount corresponding to the phase shift. Specifically, in FIG. 2, when the phase of the PAM waveform is shifted to the right, the output timing is corrected to be delayed by the amount corresponding to the phase shift and, when the phase of the waveform is shifted to the left, the output timing is corrected to be advanced by the amount corresponding to the phase shift.

Next, a specific PAM waveform output operation will be described in detail with reference to FIG. 3 through FIG. 6.

Figure 4:
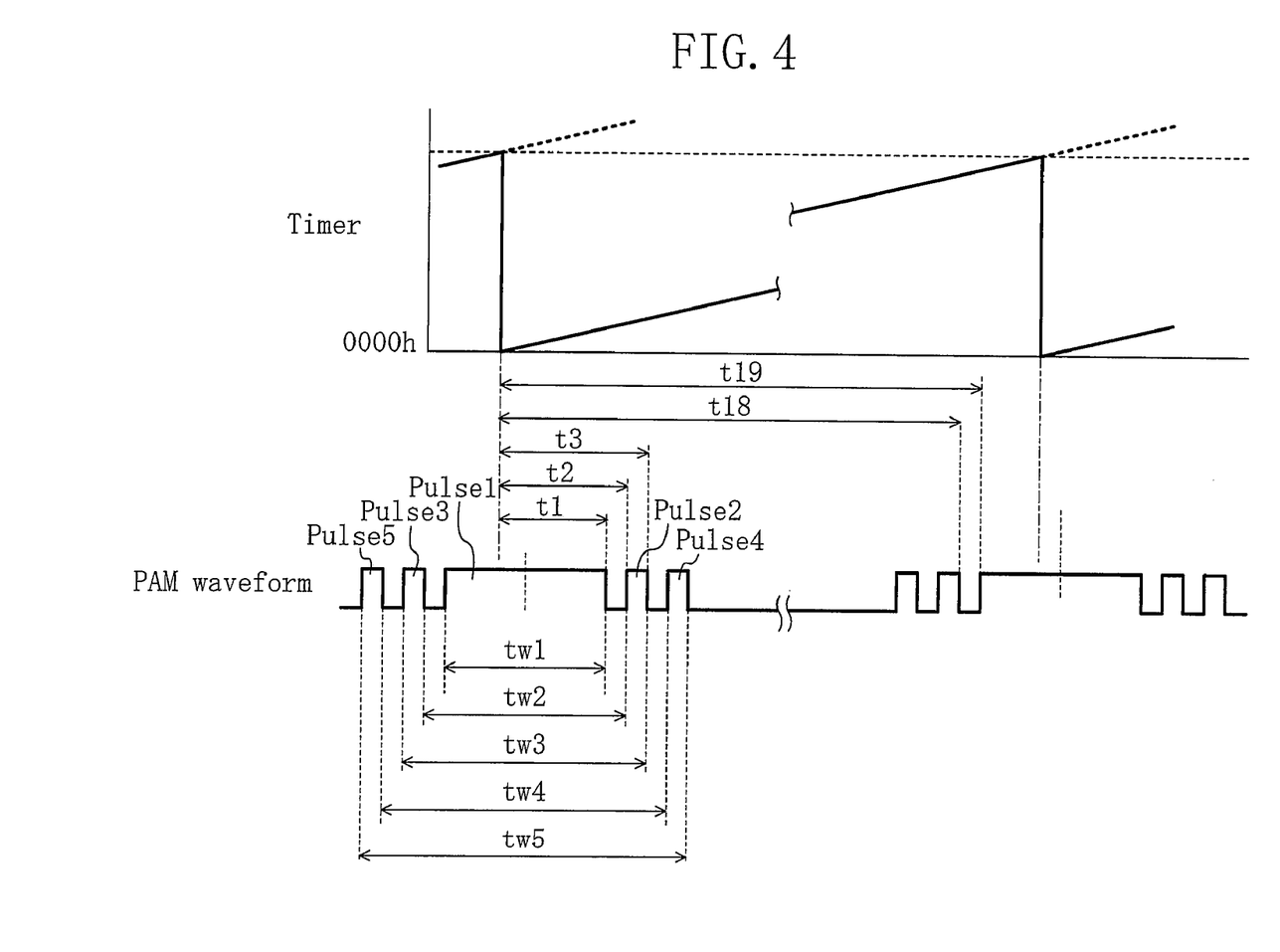
FIG. 4 is a waveform diagram describing an output timing of the PAM waveform.

As shown in FIG. 3, when a trailing edge point of a zero-cross signal is detected by the zero-cross detector section (5a), the timer section (5c) starts a count. Then, the PAM waveform output section (5b) outputs ON/OFF pulses with a predetermined timing. Specifically, as shown in FIG. 4, when a count of the timer section (5c) is "t1," an OFF pulse is output first. Subsequently, each time the count of the timer section (5c) becomes "t2", "t3", ... "t18" or "t19," an ON/OFF pulse is output so that ON and OFF pulses alternately appear. Thus, the PAM waveform corresponding to one cycle of an input voltage is output. In consideration of a (estimated) time between the trailing edge point and the zero-cross point P, the count values "t2," "t3," ... "t18" and "t19" are given so that a PAM waveform is output with a predetermined timing based on the zero-cross point P.

When a subsequent trailing edge point of the zero-cross signal is detected, the timer section (5c) is reset and restarts a count. Thus, ON and OFF pulses are alternately output with the same timing as the output timing described above. In this case, since each ON pulse is generated so as to extend over the zero-cross point P, an OFF pulse is output first as desired. Therefore, a desired PAM waveform can be reliably generated.

In this embodiment, when the waveform of an input current is distorted due to distortion of an input voltage or the like, a control in which the phase of the PAM waveform is shifted to cause the waveform of the input current to approximate to a sine wave. Hereinafter, the case where the phase of the PAM waveform is shifted to the right as viewed in FIG. 5 will be described.

Figure 5:
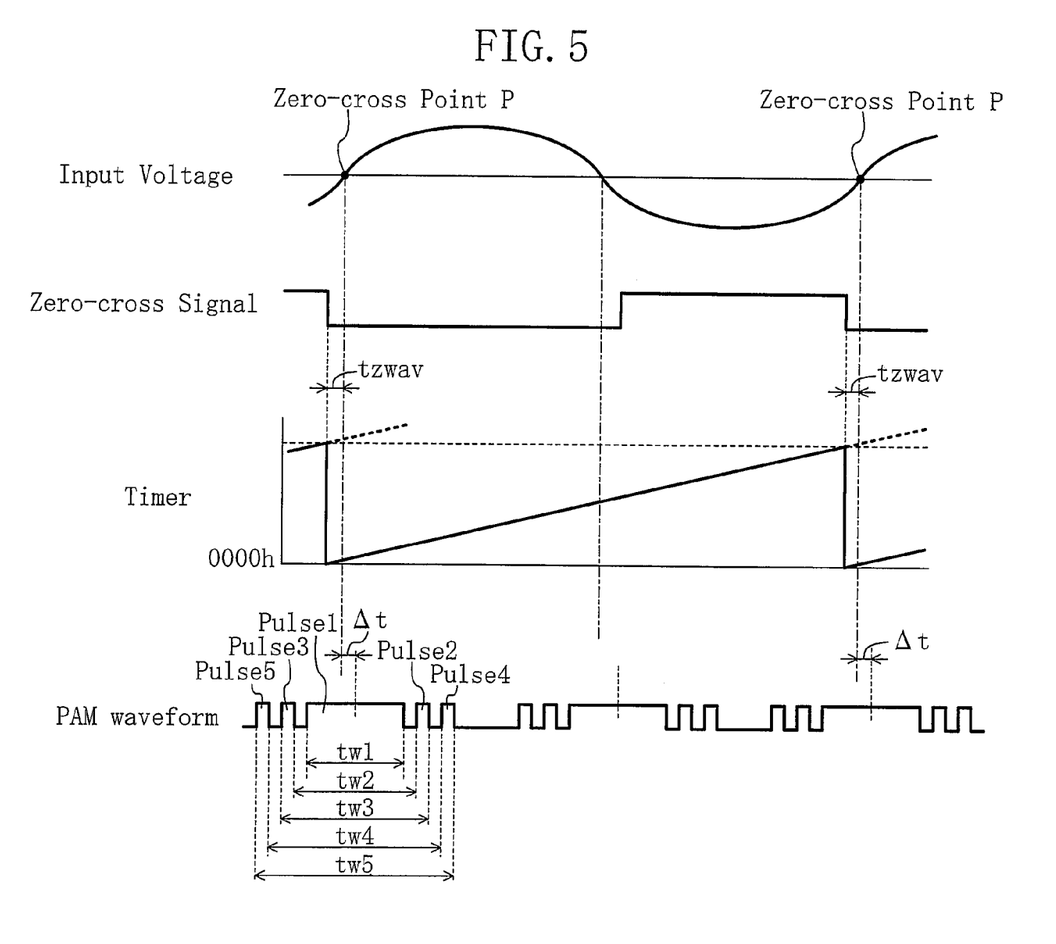
FIG. 5 is a waveform diagram showing an output state of the PAM waveform when a phase of the PAM waveform is shifted.

As shown in FIG. 5, when the PAM waveform is shifted to the right by Δt, the output timing set in the PAM waveform output section (5b) is corrected. That is, the output timing set at an initial stage is corrected to be delayed by Δt. Thus, when a trailing edge point of a zero-cross signal is detected and the timer section (5c) starts a count, the PAM waveform output section (5b) outputs ON/OFF pulses with the corrected timing.

Figure 6:
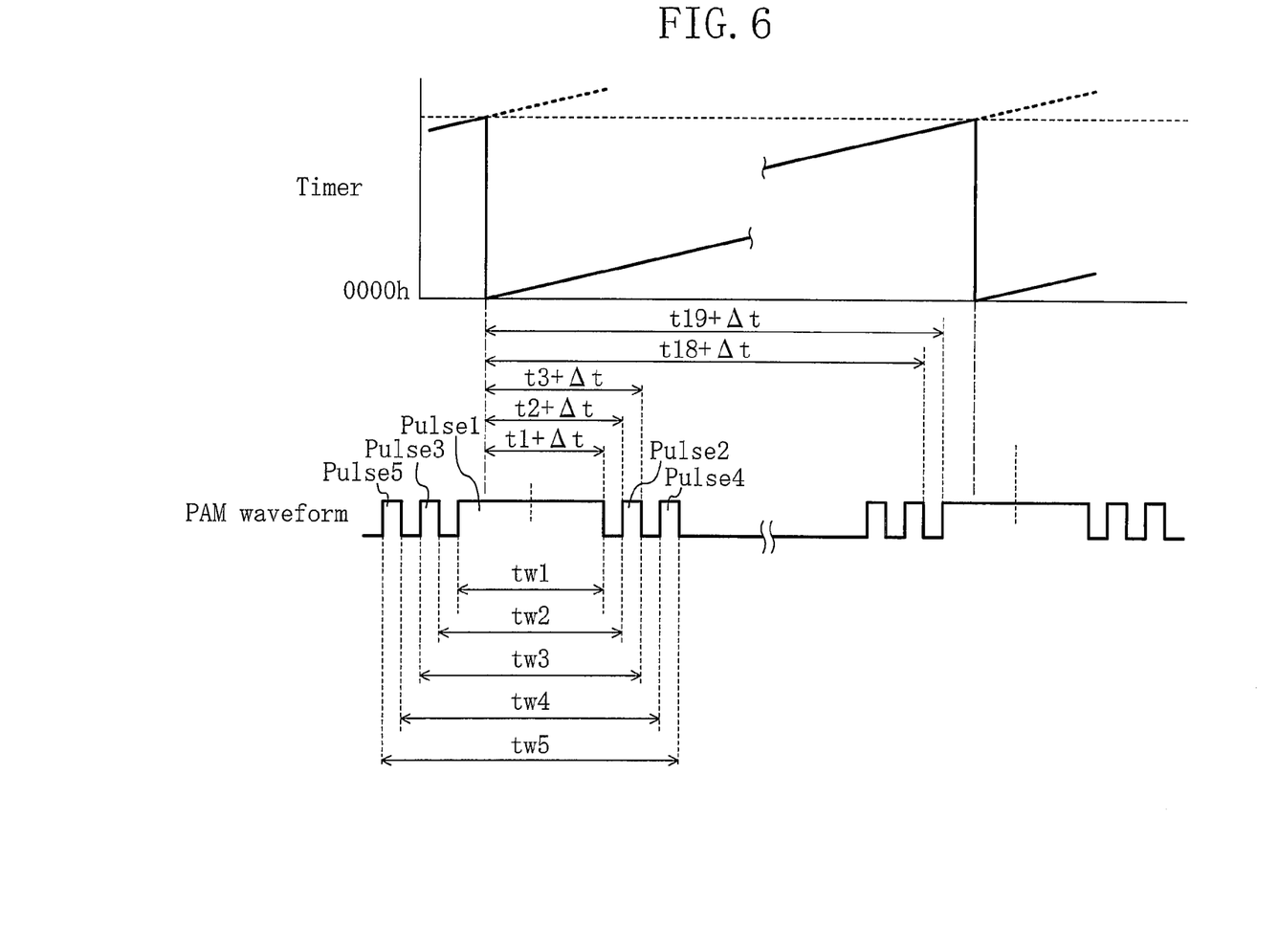
FIG. 6 is a waveform diagram describing an output timing of the PAM waveform when the phase of the PAM waveform is shifted.

Specifically, as shown in FIG. 6, first, when a count of the timer section (5c) becomes "t1+Δt," an OFF pulse is output. Subsequently, each time the count of the timer section (5c) becomes "t2+Δt," "t3+Δt," ... "t18+Δt" or "t19+Δt," an ON/OFF pulse is output so that ON and OFF pulses alternately appear. Thus, a PAM waveform can be generated without changing the pulse width of the pulse group and predetermined dimensions of tw1 through tw5.

Moreover, even when the phase of the PAM waveform is shifted, the pulse 1 (ON pulse) can be maintained to extend over the zero-cross point P. Thus, each time a trailing edge point is detected, an OFF pulse is reliably output. Accordingly, a desired PAM waveform can be reliably generated.

Note that, in contrast to the above, in the case where the phase of the PAM waveform is shifted by Δt to the left as viewed in FIG. 2, when the count of the timer section (5c) becomes "t1−Δt," an OFF pulse is output. Subsequently, each time the count becomes "t2−Δt," "t3−Δt," ... "t18−Δt" or "t19−Δt," an ON/OFF pulse is output so that ON and OFF pulses alternately appear. In this case, a PAM waveform can be generated without changing the pulse width of the pulse group and the predetermined dimensions of tw1 through tw5.

Effects of First Embodiment

According to this embodiment, ON/OFF pulses are output so that an ON pulse of the pulse group is generated to extend over the zero-cross point P of an input voltage. Thus, even though a phase of a PAM waveform is shifted, an OFF pulse can be output first at any time. Specifically, according to a known technique, when the phase of the PAM waveform is shifted, so that an ON pulse no longer extends over the zero-cross point P and, instead, a subsequent OFF pulse extends over the zero-cross point P, an ON pulse has to be output first. Accordingly, two different timings, i.e., an output timing with which an ON pulse is output first, and another output timing with which an OFF pulse is output first are needed. However, according to this embodiment, in contrast to the known technique, only one output timing is needed. Accordingly, a plurality of output timings do not have to be prepared, so that PAM control can be simplified and also improved controllability for the PAM control can be achieved.

Moreover, since only one output timing is needed, it is not necessary to prepare multiple timings for the timer section (5c). That is, a situation where, in addition to the timer section (5c) of this embodiment, another timer section for starting a count for another timing has to be provided when an ON pulse does not extend over the zero-cross point P can be avoided. Accordingly, the configuration of the microcomputer (15) can be simplified.

As described above, ON/OFF pulses can be output with a predetermined timing. Thus, a desired PAM waveform can be reliably generated. As a result, the waveform of the input current can be reliably caused to be a sine wave, so that the high frequency current can be further reduced.

In the pulse group, a pulse (pulse 1) extending over the zero-cross point P is generated to have a larger width than the widths of the other pulses, so that it is possible to maintain a state where the pulse 1 extends over the zero-cross point P. Thus, a predetermine PAM control can be reliably performed.

Moreover, according to this embodiment, the pulse group is generated for each zero-cross point. Thus, a waveform of an input current can be caused to be a smoother sine wave.

Other Embodiments

The electric power supply circuit of the above-described embodiment may have the following configuration.

For example, according to the above-described embodiment, the pulse group to be generated for each zero-cross point includes five pulses. However, the number of pulses included in the pulse group is not limited thereto, but may be seven or nine. Also, the number of the pulses in the pulse group is not limited to an odd number, but may be an even number.

According to the above-described embodiment, the timer section (5c) starts a count at a trailing edge point of the zero-cross signal. However, the present invention is not limited thereto. For example, the zero-cross detector section (5a) may be configured to detect the zero-cross point P itself, and then, the timer section (5c) may be configured to start a count at the zero-cross point P.

The above-described embodiment is merely illustrative of the present invention, and there is no intention to limit the scope of the disclosure, products to which the disclosure is applied and its application.

INDUSTRIAL APPLICABILITY

As has been described, the present invention is useful as an electric power supply circuit for reducing a high frequency current in a rectifier circuit by performing a PAM control.

The invention claimed is:

1. An electric power supply circuit, comprising:
   a rectifier circuit, coupled to an alternating current power supply, for rectifying an alternating current;
   a switching element for causing, when being turned ON, a short-circuit for output power of the rectifier circuit; and
   a PAM control section configured to output, with a predetermined timing based on a zero-cross point of an input voltage of the rectifier circuit, a single timing pattern of a fixed width, including a plurality of ON/OFF pulses during each half period to cause the switching element to perform switching so that a waveform of the input current approximates to a sine wave,
   wherein the PAM control section is configured to output only the single timing pattern in which an OFF pulse is output first based on the zero-cross point, and subsequently, the ON/OFF pulses are output alternately, and
   the PAM control section is configured to output an ON pulse extending over the zero-cross point of the input voltage of the rectifier circuit and two or more ON pulses generated both before and after said ON pulse extending over the zero-cross point during each half period of the input voltage.

2. The electric power supply circuit of claim 1, wherein the PAM control section is configured so that an ON/OFF pulse group, formed of the ON pulse extending over the zero-cross point and the two or more ON pulses generated both before and after the ON pulse and having a smaller width than that of the ON pulse, is generated for each zero-cross point.

3. The electric power supply circuit of claim 2, wherein the ON/OFF pulse group is formed of ON/OFF pulses arranged in a symmetrical pattern with respect to the ON pulse extending over the zero-cross point.

4. The electric power supply circuit of claim 1 or 2, wherein the PAM control section includes:
   a zero-cross detector section for detecting an increase in the input voltage of the rectifier circuit toward the zero-cross point to a level equal to or higher than a predetermined level;
   a timer section for resetting and starting a count each time the zero-cross detector section detects the increase in the input voltage; and
   a PAM waveform output section configured to output with a predetermined timing, using a count of the timer section, an OFF pulse first after a lapse of a certain time from a first zero-cross point since the detection by the zero-cross detector section, and thereafter, alternately output ON and OFF pulses with a predetermined timing.

5. The electric power supply circuit of claim 4, wherein, when an output phase of ON/OFF pulses is shifted, the PAM waveform output section is configured to correct an output timing of each of the ON/OFF pulses by an amount corresponding to a shift each time the zero-cross detector section detects the increase in the input voltage.

6. The electric power supply circuit of claim 1 or 2, wherein the rectifier circuit is a diode bridge circuit, and
   the electric power supply circuit is configured so that two capacitors coupled in series with each other are provided at an output side of the diode bridge circuit, an input side of the diode bridge circuit and a point between the two capacitors are coupled via the switching element, and thereby, double voltage rectification is performed.

* * * * *